United States Patent
Park

(10) Patent No.: US 6,700,286 B2
(45) Date of Patent: Mar. 2, 2004

(54) STATOR STRUCTURE OF RECIPROCATING MOTOR

(75) Inventor: Kyeong Bae Park, Gwangmyoung (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/987,183

(22) Filed: Nov. 13, 2001

(65) Prior Publication Data

US 2002/0105248 A1 Aug. 8, 2002

(30) Foreign Application Priority Data

Feb. 2, 2001 (KR) .......................................... 2001-5123

(51) Int. Cl.[7] .............................................. H02K 15/02
(52) U.S. Cl. ...................... 310/217; 310/17; 310/216; 310/254
(58) Field of Search ................................ 310/216, 217, 310/42, 15, 17, 254, 266

(56) References Cited

U.S. PATENT DOCUMENTS

| | | | | |
|---|---|---|---|---|
| 1,375,072 A | * | 4/1921 | Atkins ........................ 310/217 |
| 3,463,955 A | * | 8/1969 | Scardina et al. ............. 310/317 |
| 3,497,735 A | * | 2/1970 | Diederichs .................... 310/42 |
| 3,502,914 A | * | 3/1970 | Cox ........................... 310/217 |
| 4,038,624 A | * | 7/1977 | Namba et al. ................. 336/60 |
| 4,937,481 A | * | 6/1990 | Vitale .......................... 310/15 |
| 5,945,748 A | * | 8/1999 | Park et al. .................... 310/12 |

* cited by examiner

*Primary Examiner*—Burton Mullins
(74) *Attorney, Agent, or Firm*—Birch, Stewart, Kolasch & Birch, LLP

(57) ABSTRACT

A stator structure of reciprocating motor is provided. The stator structure includes a cylindrical stacked core having a plurality of lamination sheets each having a hanging groove, and an elastic ring elastically inserted into and fixed to the hanging groove. The lamination sheets are arranged extending radially and axially with respect to a longitudinal centerline of the cylindrical stacked core. Accordingly, the cylindrical stacked core is firm and the fastening strength between the cylindrical stacked core and an outer core is improved. Therefore, the reliability of the stator structure is improved. Also, it is possible to reduce manufacturing costs and to improve assembly productivity.

16 Claims, 3 Drawing Sheets

STATOR STRUCTURE OF RECIPROCATING MOTOR

BACKGROUND OF THE INVENTION

1. Field of the Invention

The present invention relates to a stator structure of a reciprocating motor, and more particularly, to a stator structure of a reciprocating motor, which is capable of simplifying the processing and the assembling of parts.

2. Description of the Background Art

In general, a reciprocating motor is formed by making the flux of a common three-dimensional motor plane. A plane moving part linearly moves on a plane according to a change in the flux formed on a plane fixed part. The reciprocating motor according to the present invention can be in a linear reciprocating motion by attaching a plurality of plane magnets to the cylindrical circumference of a moving magnet by applying the above principle.

FIGS. 1 and 2 respectively show an example of the reciprocating motor. As shown in FIGS. 1 and 2, the reciprocating motor includes a stator S consisting of a cylindrical outer core 10 and a cylindrical inner core 20, which is inserted into the outer core 10, a winding coil 30 combined with the outer core 10 or the inner core 20 inside the outer core 10 or the inner core 20, and a moving magnet 40, which includes permanent magnets 41 and is inserted between the outer core 10 and the inner core 20 to be movable. In FIGS. 1 and 2, the winding coil is combined with the outer core.

In the above-mentioned reciprocating motor, when current flows through the winding coil 30, flux is formed around the winding coil 30 due to the current that flows through the winding coil 30. The flux forms a closed loop along the outer core 10 and the inner core 20.

Because the permanent magnets 41 receive force in an axial direction due to the mutual action between the flux formed in the outer core 10 and the inner core 20 and the flux formed by the permanent magnets 41, the moving magnet 40 is in a linear motion in the axial direction between the outer core 10 and the inner core 20. When the direction of the current applied to the winding coil 30 is alternately changed, the moving magnet 40 is in a linear reciprocating motion.

The outer core 10 is a cylindrical stacked core formed by radially stacking lamination sheets 11, which are predetermined shaped thin plates.

When the winding coil 30 is combined with the outer core 10, a bobbin 50 is used for forming the winding coil 30 in order to secure electrical insulation and the convenience of fabrication. The winding coil 30 is formed by winding coil around the ring-shaped groove of the bobbin 50 in multiple layers. Wound coil is connected to a terminal 51.

A plurality of lamination sheets 11 formed of thin plates are radially stacked on the bobbin 50 to be cylindrical, to thus form the outer core 10.

The inner core 20 is a stacked core formed by radially stacking a plurality of lamination sheets 21 formed of predetermined shaped thin plates to be cylindrical. The inner core 20 is inserted into the outer core 10 to be separated from the outer core 10 by a predetermined distance.

The moving magnet 40 is formed by combining the plurality of permanent magnets 41 with a cylindrical permanent magnet holder 42 such that the permanent magnets 41 are separated from each other by the same distance. The moving magnet 40 is inserted between the outer core 10 and the inner core 20 to be in a linear motion.

When the reciprocating motor is loaded in another system, the stator, that is, the outer core 10 and the inner core 20 are fixed to and combined with the system.

FIG. 3 shows an example of a conventional structure, in which the inner core 20 is combined with a frame that forms the system, between the stacked cores that form the stator, that is, the outer core 10 and the inner core 20.

As shown in FIG. 3, ring-shaped inserting grooves a of a predetermined width and a predetermined depth are respectively formed in both sides of a cylindrical stacked core E formed by stacking the plurality of lamination sheets 21. Ring-shaped fixing rings 22 are press fitted in the inserting grooves a.

The frame 60 includes a base 61 formed to have a predetermined shaped area and a cylindrical loading portion 62 extendedly formed in the middle of the base 61 to have a predetermined length. The cylindrical stacked core E is press fitted in and combined with the outer circumference of the loading portion 62 of the frame 60.

The inserting grooves a formed in the cylindrical stacked core E are formed by forming grooves in both sides of the lamination sheets 21 that form the cylindrical stacked core E and stacking the lamination sheets 21, in which the grooves are formed, to be cylindrical.

The fixing rings 22 are formed to have the section corresponding to the section of the inserting grooves a and the diameter equal to the diameter of the inserting grooves a.

The fastening strength of the cylindrical stacked core E formed by stacking the plurality of lamination sheets 21 and the press fit strength between the cylindrical stacked core E and the frame 60 is determined by the processing precision of the fixing rings 22.

That is, when the degree of precision between the fixing rings 22 and the inserting grooves a is low, the fastening strength of the cylindrical stacked core E is low and the combination strength between the cylindrical stacked core E and the frame 60 is low. Therefore, the cylindrical stacked core E easily drifts away from the frame 60.

When the degree of precision between the fixing rings 22 and the inserting grooves a is high, the fastening strength of the cylindrical stacked core E is high and the cylindrical stacked core E is press fitted in the frame 60. In this case, when the cylindrical stacked core E is combined with the frame 60, parts are transformed or scratched.

As mentioned above, in the conventional combination structure of the stacked core that is the cylindrical stacked core E, the processing of the fixing rings 22 and the processing of the loading portion 62 of the frame 60 must be precise in order to maintain the fastening strength of the cylindrical stacked core E and the combination strength between the cylindrical stacked core E and the frame 60 to be appropriate. Accordingly, the processing expenses are high and the assembly productivity is deteriorated.

SUMMARY OF THE INVENTION

Therefore, an object of the present invention is to provide a stator structure of a reciprocating motor, which is capable of simplifying the processing and the assembling of parts.

One or more of these and other objects of the present invention are accomplished by a stator structure for a reciprocating motor, said stator structure comprising a cylindrical, stacked core having a plurality of lamination sheets, wherein each of said lamination sheets extends radially and axially with respect to a longitudinal centerline of said cylindrical, stacked core: a plurality of hanging grooves, wherein each of said hanging grooves includes a receiving groove and a settling groove being recessed and formed within said receiving groove, and at least one of said hanging grooves is respectively provided for each of said lamination sheets; and an elastic ring being elastically inserted into and secured within said hanging grooves for securing said lamination sheets to said cylindrical, stacked core.

One or more of these and other objects of the present invention are also accomplished by a reciprocating motor having a stator structure, a winding coil combined with said stator structure, and a moving magnet between an inner core and an outer core of said stator structure, said stator structure comprising a cylindrical, stacked core having a plurality of lamination sheets, wherein each of said lamination sheets extends radially and axially with respect to a longitudinal centerline of said cylindrical, stacked core; a plurality of hanging grooves, wherein each of said hanging grooves includes a receiving groove and a settling groove being recessed and formed within said receiving groove, and at least one of said hanging grooves is respectively provided for each of said lamination sheets; and at least one elastic ring being elastically inserted into and secured within said hanging grooves for securing said lamination sheets to said cylindrical stacked core.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

A stacked core fastening structure in a reciprocating motor according to the present invention will now be described in detail with reference to an embodiment shown in the accompanying drawings.

Figure 1:
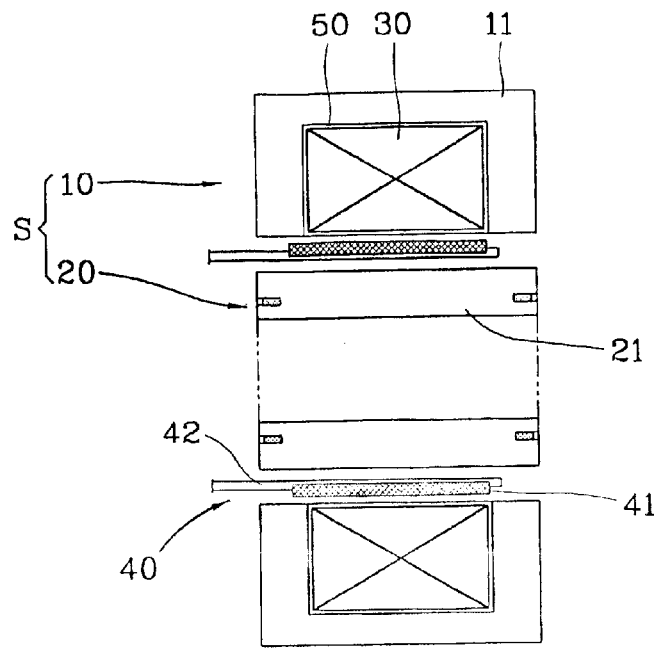
FIG. 1 is a sectional view showing an example of a conventional reciprocating motor.
Figure 2:
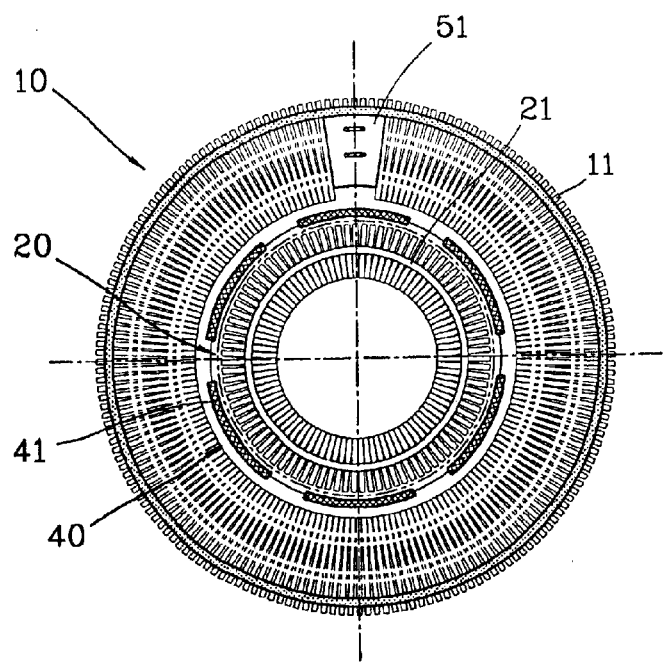
FIG. 2 is a side view showing the example of the conventional reciprocating motor.
Figure 3:
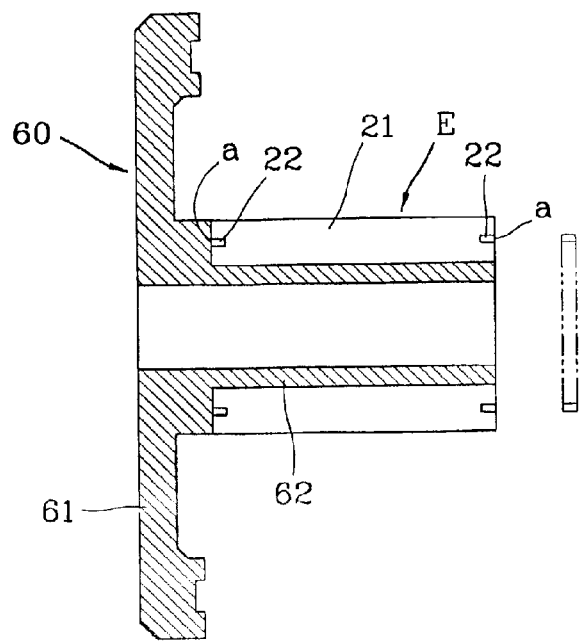
FIG. 3 is a sectional view showing that an inner core is combined with a frame in the conventional reciprocating motor.
Figure 4:
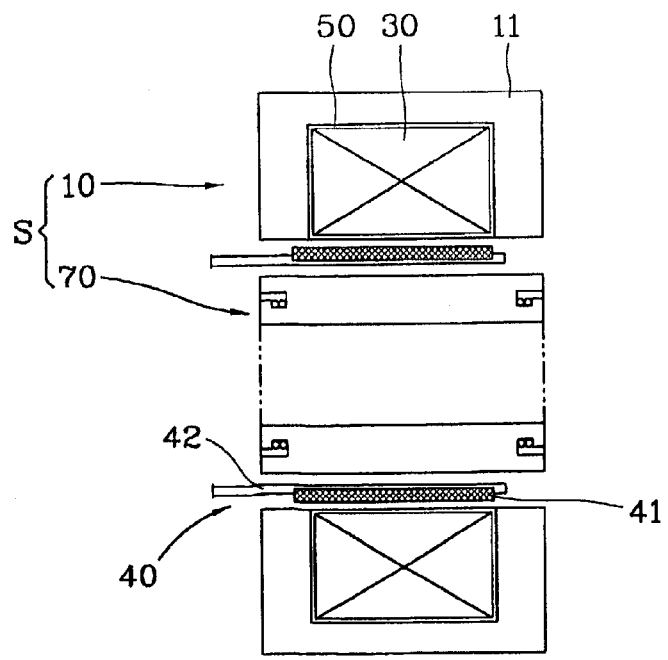
FIG. 4 is a sectional view showing a reciprocating motor according to the present invention, which includes an example of a stacked core fastening structure.

FIG. 4 shows a reciprocating motor according to the present invention, which includes an example of a stacked core fastening structure. The reciprocating motor includes a stator S consisting of a cylindrical outer core 10 and an inner core 70 inserted into the outer core 10 to be separated from the outer core 10 by a predetermined distance, a winding coil 30 combined with the outer core 10 in the outer core 10, and a moving magnet 40, which includes permanent magnets 41 and is inserted between the outer core 10 and the inner core 70 to be movable.

The outer core 10 that forms the stator S is formed by radially stacking a plurality of lamination sheets 11 formed of predetermined shaped thin plates to be cylindrical.

A cylindrical bobbin 50, around which coil is wound, is combined with the outer core 10 in the outer core 10.

The winding coil 30 is formed by winding coil around the bobbin 50 in multiple layers. The bobbin 50 is used for the electrical insulation and the convenience of fabrication of the winding coil 30.

Figure 5:
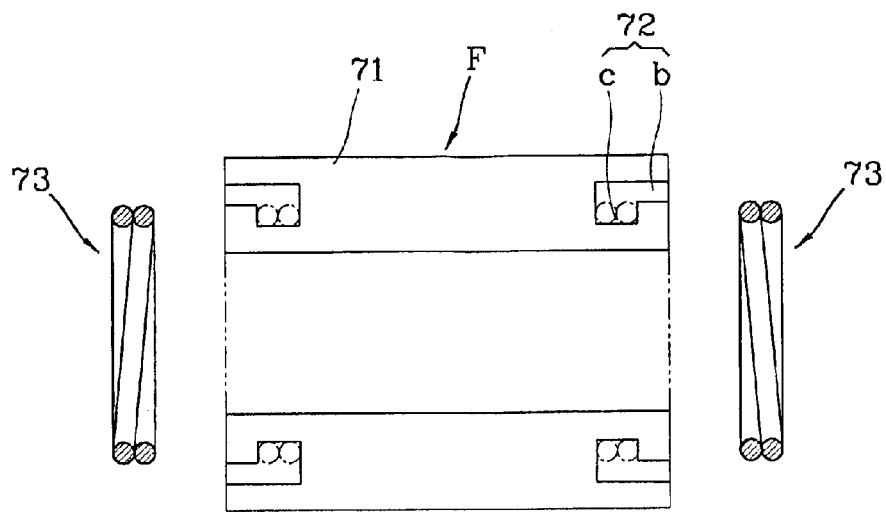
FIG. 5 is a disassembled sectional view of the stacked core fastening structure in the reciprocating motor according to the present invention.

As shown in FIG. 5, ring-shaped hanging grooves 72 are formed in a cylindrical stacked core F formed by radially stacking the plurality of lamination sheets to be cylindrical. Elastic rings 73 are inserted into and fixed to the hanging grooves 72. That is how the inner core 70 is formed.

The hanging grooves 72 are formed in both sides of the cylindrical stacked core F. The hanging groove 72 is formed of a receiving groove b, whose section has a uniform width, and a settling groove c, which is formed to have a width larger than the width of the receiving groove b, to thus form a jaw.

The hanging grooves 72 of the cylindrical stacked core F are formed by forming the receiving grooves b and the settling grooves on both sides of lamination sheets that form the cylindrical stacked core F and radially stacking the lamination sheets 71 including the receiving grooves b and the settling grooves c to be cylindrical.

The elastic rings 73 are formed by winding magnetic wire of a predetermined length once or a plurality of times to form a circle.

In another modification of the elastic ring 73, non-magnetic wire of a predetermined length is wound once or a plurality of times to form a circle.

When the elastic rings 73 are combined with the hanging grooves 72, the elastic rings 73 with their diameters enlarged are inserted into and are pushed in the receiving grooves b of the hanging grooves 72 of the stacked core F and are positioned in the settling grooves c.

The elastic rings 73 inserted into the settling grooves c of the hanging grooves 72 press and fix the cylindrical stacked core F with their diameters reduced by elasticity.

The elastic rings 73 positioned in the settling grooves c of the hanging grooves 72 do not drift away due to the jaws of the settling grooves c and the receiving grooves b.

Figure 6:
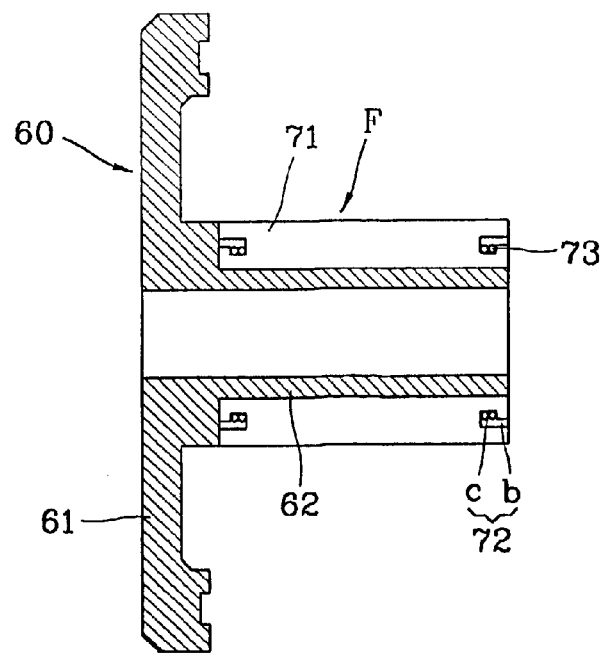
FIG. 6 is a sectional view showing that an inner core is combined with a frame in the reciprocating motor according to the present invention.

When the inner core 70 formed of the stacked core is loaded in a frame 60 that forms the system in order to load the reciprocating motor in the system, as shown in FIG. 6, the frame 60 includes a cylindrical loading portion 62 extendedly formed in the middle of a base 61 formed to have a predetermined shaped area to have a predetermined length. The cylindrical stacked core F is press fitted in and combined with the loading portion 62 of the frame 60.

The effect of the stacked core fastening structure in the reciprocating motor according to the present invention will now be described as follows.

In the reciprocating motor, when power is applied and current flows through the winding coil 30, flux is formed around the winding coil 30 due to the current that flows through the winding coil 30. The flux forms a closed loop along the outer core 10 and the inner core 70.

The permanent magnets 41 receive force in an axial direction due to the mutual action between the flux formed in the outer core 10 and the inner core 70 and the flux formed in the permanent magnets 41. Accordingly, the moving magnet 40 is in a linear motion in the axial direction between the outer core 10 and the inner core 70. When the direction of the current applied to the winding coil 30 is alternately changed, the moving magnet 40 is in a linear reciprocating motion.

Because the elastic rings 73 are combined with and fixed to the cylindrical stacked core F that forms the inner core 70, the cylindrical stacked core F is firmly combined with and easily assembled with the frame 60. Although, the processing precision of parts is not precise, the fastening strength between the cylindrical stacked core F and the frame 60 is excellent.

That is, the elastic rings 73 are widened and inserted into the hanging grooves 72 formed in the cylindrical stacked core F, the combination process is simple. Also, because the cylindrical stacked core F is fixedly combined with the frame 60 by the elastic rings 73, the cylindrical stacked core F is firmly combined with the frame 60.

When the cylindrical stacked core F fasted by the elastic rings 73 is combined with the frame 60, the inner circumference of the cylindrical stacked core F can be transformed due to the elastic transformation of the elastic rings 73. Therefore, although the processing precision of the frame 60 is not high, the fastening processing simple and the fastening status is firm.

As mentioned above, according to the stator structure of the reciprocating motor according to the present invention, it is possible to improve the fastening strength between parts although the processing precision of the parts is not high, to thus reduce the processing expenses of the parts and to improve the reliability of the parts. Also, because the processing and the assembling of the parts are simple, it is possible to improve the assembly productivity.

What is claimed is:

1. A stator structure for a reciprocating motor, said stator structure comprising:
    a cylindrical, stacked core having a plurality of lamination sheets, wherein each of said lamination sheets extends radially and axially with respect to a longitudinal centerline of said cylindrical, stacked core;
    a plurality of hanging grooves, wherein each of said hanging grooves includes a receiving groove and a settling groove being recessed and formed within said receiving groove, and at least one of said hanging grooves is respectively provided for each of said lamination sheets; and
    an elastic ring being elastically inserted into and secured within said hanging grooves for securing said lamination sheets to said cylindrical, stacked core.

2. The stator structure according to claim 1, wherein the hanging grooves collectively form a ring shape.

3. The stator structure according to claim 1, wherein the hanging grooves are formed in both a first longitudinal end and a second longitudinal end of each lamination sheet of said lamination sheets.

4. The stator structure according to claim 1, wherein each of said receiving grooves has a uniform width, and each of said settling grooves connected to the receiving groove has a width larger than the width of the receiving groove.

5. The stator structure according to claim 1, wherein the elastic ring is formed by a wound magnetic wire having a predetermined length and a circular shape.

6. The stator structure according to claim 1, wherein the elastic ring is formed by a wound non-magnetic wire having a predetermined length and a circular shape.

7. The stator structure according to claim 5, wherein the stator structure includes at least two elastic rings.

8. The stator structure according to claim 6, wherein the stator structure includes at least two elastic rings.

9. A reciprocating motor having a stator structure, a winding coil combined with a said stator structure, and a moving magnet between an inner core and an outer core of said stator structure, said stator structure comprising:
    a cylindrical, stacked core having a plurality of lamination sheets, wherein each of said extends radially and axially with respect to a longitudinal centerline of said cylindrical, stacked core;
    a plurality of hanging grooves, wherein each of said hanging grooves includes a receiving groove and a settling groove being recessed and formed within said receiving groove, and at least one of said hanging grooves is respectively provided for each of said lamination sheets; and
    at least one elastic ring being elastically inserted into and secured within said hanging grooves for securing said lamination sheets to said cylindrical, stacked core.

10. The reciprocating motor according to claim 9, wherein the hanging grooves collectively form a ring shape.

11. The reciprocating motor according to claim 9, wherein the hanging grooves are formed in both a first longitudinal end and a second longitudinal end of each lamination sheet of said lamination sheets.

12. The reciprocating motor according to claim 9, wherein each of said receiving has a uniform width, each of said settling grooves connected to the receiving groove has a width larger than the width of the receiving groove.

13. The reciprocating motor according to claim 9, wherein the elastic ring is formed by a wound magnetic wire having a predetermined length and a circular shape.

14. The reciprocating motor according to claim 9, wherein the elastic ring is formed by a wound non-magnetic wire having a predetermined length and a circular shape.

15. The reciprocating motor according to claim 13, wherein the stator structure includes at least two elastic rings.

16. The reciprocating motor according to claim 14, wherein the stator structure includes at least two elastic rings.

* * * * *